H. DORNING.
MACHINE FOR COILING TUBING.

No. 177,225. Patented May 9, 1876.

Witnesses: F. A. Pollock, R. Ogden

Hugh Dorning, Inventor
By Connolly Brost & McTighe, Attorneys

UNITED STATES PATENT OFFICE.

HUGH DORNING, OF PITTSBURG, PENNSYLVANIA, ASSIGNOR, BY MESNE ASSIGNMENTS, OF PART OF HIS RIGHT TO GEORGE A. BANNAUTINE, SR., OF SAME PLACE, AND GEORGE A. BANNAUTINE, JR.

IMPROVEMENT IN MACHINES FOR COILING TUBING.

Specification forming part of Letters Patent No. 177,225, dated May 9, 1876; application filed February 29, 1876.

*To all whom it may concern:*

Be it known that I, HUGH DORNING, of Pittsburg, in the county of Allegheny and State of Pennsylvania, have invented certain new and useful Improvements in Machines for Coiling Pipe, &c.; and I do hereby declare the following to be a full, clear, and exact description of the invention, such as will enable others skilled in the art to which it pertains to make and use it, reference being had to the accompanying drawings, which form part of this specification, in which—

Figure 1:
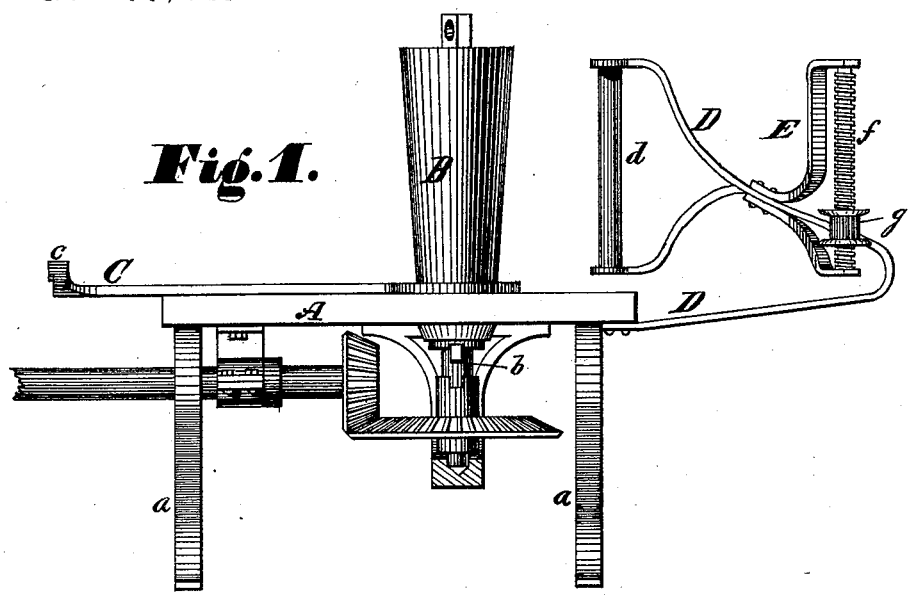
Figure 2:
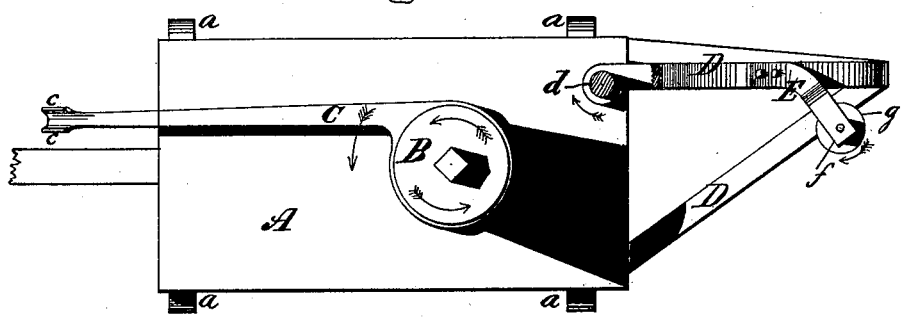

Figure 1 is a front elevation. Fig. 2 is a plan view.

This invention relates to machines for coiling metal pipe and other articles; and consists in the various devices, as hereinafter fully described and claimed.

Heretofore tubes of metal have been coiled by a stationary mandrel with a grooved follower-die, which pinched the pipe into a coil as it traveled, or in a lathe, both of which, by reason of their heavy cost, were not in the reach of manufacturers generally; besides such machines are by nature permanent fixtures, and cannot be moved about.

My object is to provide a machine which shall be cheap, simple, effective, and expeditious in its operation, and shall be light and portable, capable of operation by hand or other power, so that it can be moved to any desired or convenient place for operation.

Referring to the drawings herewith, my invention is constructed as follows: A plain table or bed, A, of a few feet area, is supported on legs $a$. A smooth mandrel, B, which may be solid or hollow, has its journal $b$ passing through bed A, and under it is keyed up to a friction-washer, or otherwise retained in place. Motion, by hand or otherwise, is given the mandrel, from above or below, at the wish of the builder, as it does not affect my principle. Securely fastened at the lower end of the mandrel, and turning with it, is a horizontally-extended sweep or arm, C, sliding round on the top of bed A. Upon the outer end of this sweep are two lugs, $c$, whose duty is to embrace the end of the pipe and keep it firmly in lateral or vertical position. For the latter purpose a shoulder may be cut from under the ends of lugs $c$, into which the coupling on the pipe end will catch; but I do not consider this essential.

From one end of the table A a brace, D, extends out a little farther than the track of sweep C, then back upwardly a short distance, and dividing into two vertical bearings, in which is placed a vertical friction-roller, $d$, about the same length as mandrel B. Bolted or otherwise attached to brace D is another brace, E, having two vertical portions, one above and one below, as seen in the drawings. Between these two portions of brace E is a vertical left-handed screw-shaft, $f$, about the same length as mandrel B. Traveling on this screw is a an internally-threaded thimble, $g$, which is made with a horizontal flange at top and bottom, and the body is fluted vertically, as shown. The purpose of screw $f$ and nut $g$ is to guide the pipe vertically, as hereinafter described. Roller $d$ and screw $f$ are so located that when the pipe is in position it shall "bite" on mandrel B and themselves, so as to prevent slipping or buckling.

Thus constructed, the operation of my machine is as follows: The pipe is placed with one end in lugs $c$ on the sweep-lever C, whence it extends back, lying relatively against the outside of mandrel B, the inside of roller $d$ and of thimble $g$, between its flanges, the remainder extending out beyond the latter. The mandrel being turned in the direction of the arrows, the sweep C goes round with it, carrying the end of pipe with it. Buckling is prevented by roller $d$, which causes the pipe to firmly hug the mandrel. As for most purposes the pipe must be spirally coiled, it is necessary to have a guide. I provide this in the nut $g$. The pipe moving along and pressing it causes it to revolve to the left, hence rises on the screw $f$, and by the lower flange lifts the pipe horizontally to the proper degree while coiling. By this means no attention is necessary, save to start and stop the machine at the beginning and end of the operation.

My machine is particularly effective in coiling the water-pipes for tuyeres, for which purpose I make the mandrel conical, as shown in the illustrations; but it is just as practicable for other purposes with a cylindrical mandrel. Of course the motions may all be reversed, and the shaft $f$ have a right-handed thread, without altering the principle; or another vertical friction-roller might be interposed between the present one and the flanged thimble, but opposite relatively. This addition might be desirable for thin pipe or other material.

My invention may be advantageously applied to many purposes besides coiling pipe—as, for instance, steam-heater coils. In that case the pipe would be given one half turn, bringing the two parts parallel, then shifted the proper distance, and given one half turn in the opposite direction, and so on till the complete zigzag coil is produced, thus dispensing with the necessity of using U-couplings.

Having fully described my invention, I claim and desire to secure by Letters Patent—

1. Mandrel B, sweep C, friction-roller $d$, and flanged nut $g$, traveling on screw $f$, all combined, arranged, and operating substantially as and for the purposes specified.

2. The combination of a mandrel B, sweep C, both continuously rotative, and a friction-roller $d$, parallel with the axis of the mandrel, and supported above the plane of rotation of the sweep, so as to permit the unobstructed passage of said sweep, substantially as shown and described.

3. In a coiling-machine, the guiding flanged nut $g$, traveling on screw $f$, substantially as shown and described.

In testimony that I claim the foregoing I have hereunto set my hand this 22d day of February, 1876.

HUGH DORNING.

Witnesses:
T. J. McTIGHE,
FLORENCE SULLIVAN.